June 24, 1958 W. A. ATKINSON 2,840,345
MOBILE HANDLING RACK FOR DIFFERENTIAL GEAR UNIT
Filed June 24, 1953 4 Sheets-Sheet 1
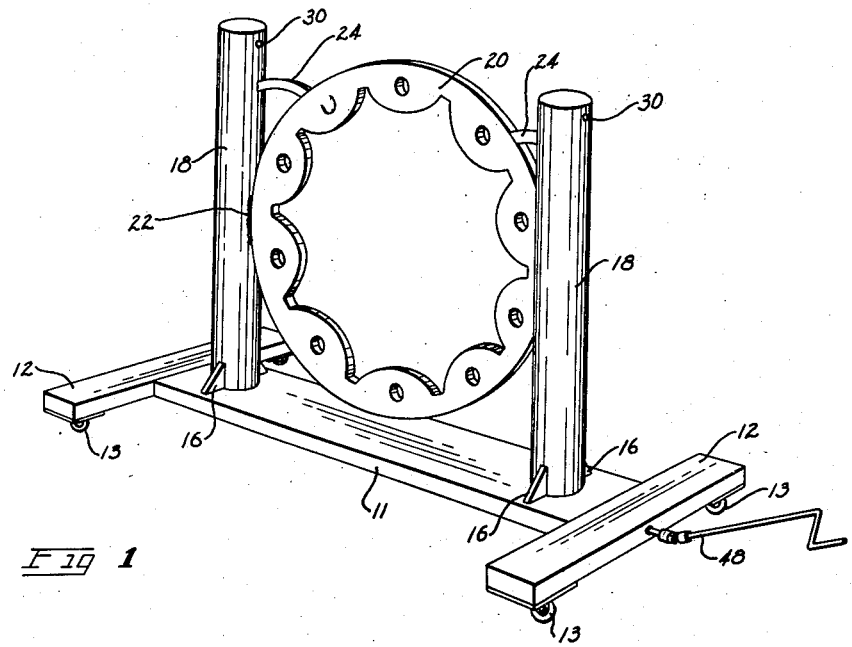
Fig 1
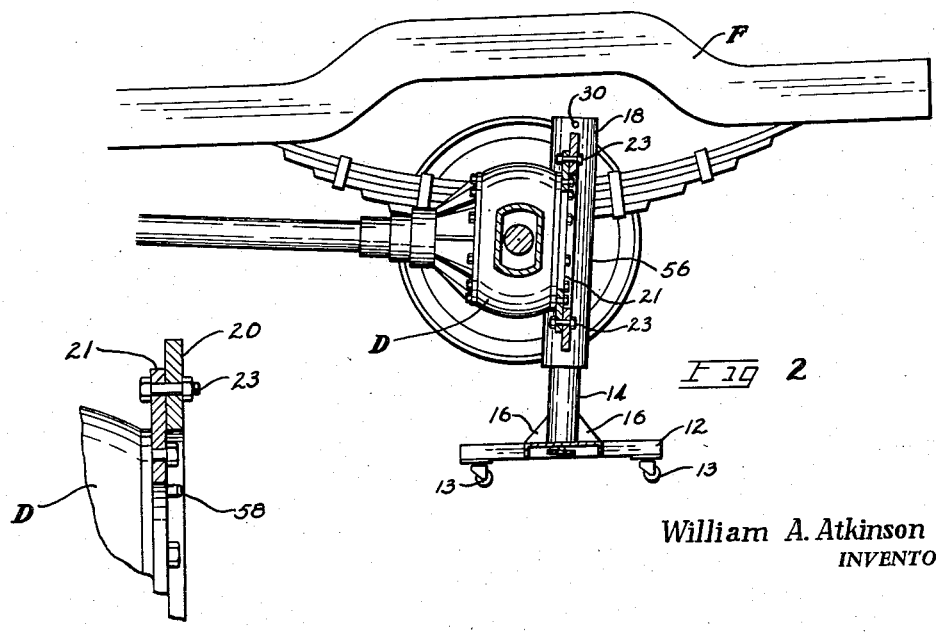
Fig 2
Fig 3
William A. Atkinson
INVENTOR.

June 24, 1958   W. A. ATKINSON   2,840,345
MOBILE HANDLING RACK FOR DIFFERENTIAL GEAR UNIT
Filed June 24, 1953   4 Sheets-Sheet 2

William A. Atkinson
INVENTOR.

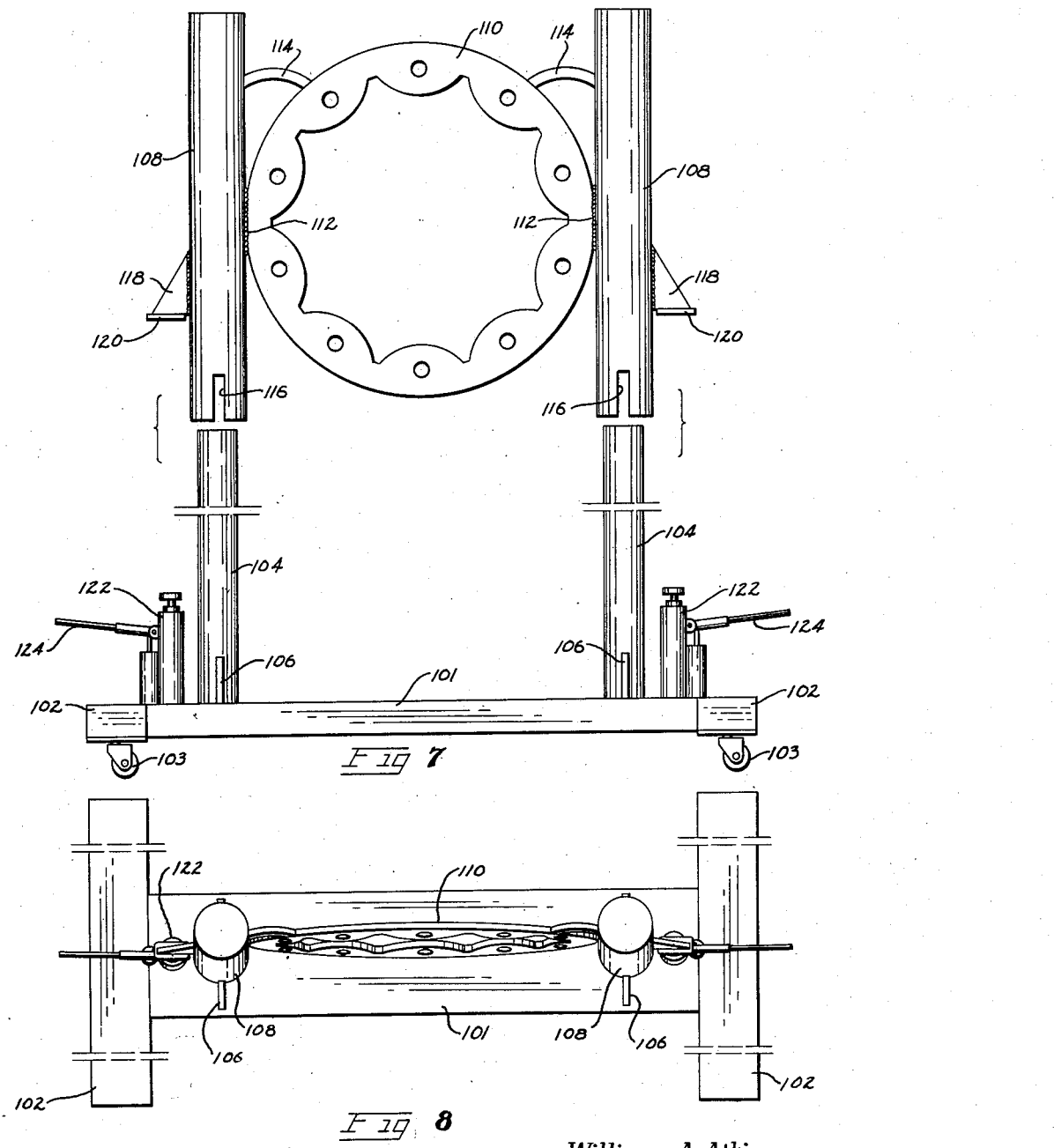

William A. Atkinson
INVENTOR.

United States Patent Office 2,840,345
Patented June 24, 1958

2,840,345

MOBILE HANDLING RACK FOR DIFFERENTIAL GEAR UNIT

William A. Atkinson, Greggton, Tex.

Application June 24, 1953, Serial No. 363,898

5 Claims. (Cl. 254—2)

This invention relates to improvements in tools for removing differential units from motor vehicles, and particularly for use in removing and replacing, without misalignment, the heavy differential unit of large trucks and the like, that are very heavy and difficult to handle.

The differential gear unit of large motor vehicles may weigh several hundred pounds, and is so positioned with respect to the vehicle that it is difficult to get to, or to remove from and still more difficult to replace this unit in proper fixed position so that it can be readily positioned in proper relation without manual handling.

The present invention provides a mobile rack that can be moved into abutting relation to the differential gear unit of a motor vehicle to support same, to enable the removal thereof from the differential housing, and to enable the replacement of same in the exact fixed relation from which it was removed, so it may be reconnected with other parts of the vehicle, after repair or installation of a new unit has been made.

An object of this invention is to provide a handling rack for the removal and replacement of a differential gear unit from the differential housing, that is mobile, adjustable as to height, and adaptable to different sizes and types of motor vehicles.

Another object of this invention is to provide a handling rack for a vehicle differential unit, the use of which will allow the unit to be replaced in the exact relation to the other parts of the vehicle and without manual handling.

Another object of this invention is to provide a handling rack for a vehicle differential unit with which the differental unit may be removed, which will hold the differential unit for ready accessibility for repair, and allow the replacement thereof into the exact placement from which it was removed, all without extra handling or moving of the heavy differential unit.

A further object of this invention is to provide a mobile handling rack for a vehicle differential unit which may be moved from place to place with the differential unit being maintained in fixed relation to said vehicle while romoved therefrom, and which differential unit may be elevated for an operation thereon, and be lowered for replacement in the same fixed relation without handling or adjustment.

Yet another object of the invention is to provide a mobile handling rack for a vehicle differential unit that may be left on the housing while an operation is being performed on the unit.

The present invention provides a safe, efficient and mobile handling rack for the differential gear unit of motor vehicles, that will eliminate the manual work connected with the removal and replacement of differential gear units heretofore, the replacement of which can be made with exacting accuracy without turning, lifting or otherwise handling the differential unit.

With the foregoing objects in mind and others that will manifest themselves as the description proceeds, reference is to be had to the accompanying drawings in which:

Fig. 1 is a perspective view of one form of the invention, showing the handling rack, embodying screw jack mechanism, in lowered position;

Fig. 2 is a side elevational view thereof, with parts broken away and shown in section, showing the adapter plate thereon and showing the device attached to the differential unit of a vehicle, preparatory to removing the differential unit from the differential housing of a vehicle;

Fig. 3 is an enlarged fragmentary elevational view of the device shown in Fig. 2, with parts shown in section to show how the adapter ring is attached to the differential unit and to the handling rack;

Fig. 7 is an exploded front elevational view of a modified form of the device using hydraulic jacks, with parts broken away and shortened;

Fig. 8 is a top plan view of the form of the invention as shown in Fig. 7, but showing the base member broken away and shortened, to illustrate the details of construction.

Figure 4:
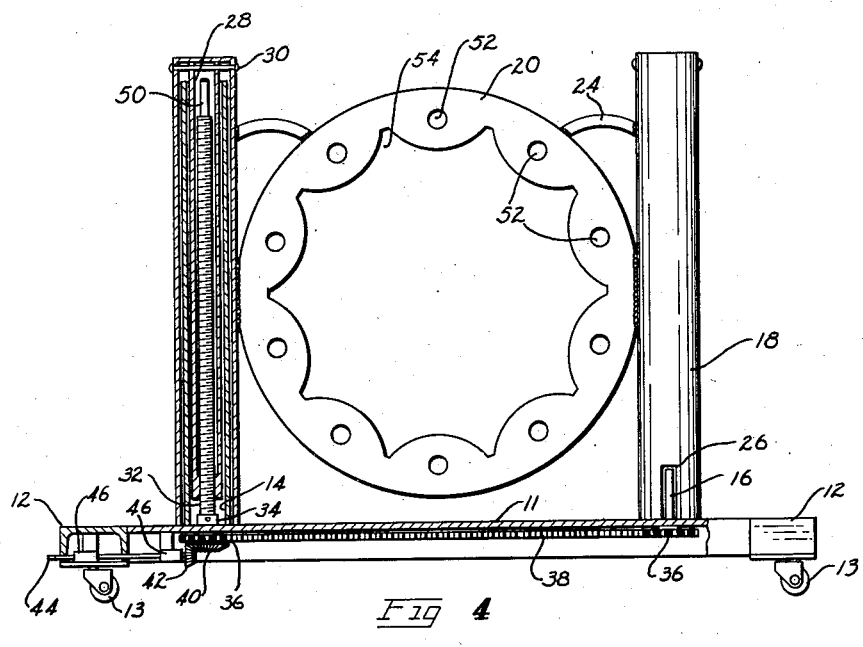
Fig. 4 is a rear elevational view of the device embodying the invention as shown in Fig. 1, with parts broken away and shown in section to bring out the details of construction.

With more detailed reference to the drawing, particularly to the form set out in Figs. 1, 2 and 4, a base designated at 11 has outwardly extending transverse end members 12 on each end thereof so as to form a stable frame-work that will not tip. Casters 13 are provided on the underside of the end members 12 near the ends thereof, which casters make the device mobile, for being moved in any desired direction.

Spaced apart, upstanding standards 14 are spaced apart and secured to the base 11 at a diverging angle with respect to the vertical. Web braces 16 are positioned, one on each side of each standard 14, and are welded to the upper face of the base 11 so as to maintain the standards 14 in a fixed relation with respect to the base 11. The standards 14 are parallel, and each has a sleeve member 18 sleeved thereover. An annular plate 20 is positioned between said sleeve members 18. The edges of the plate 20 that are adjacent the respective sleeves 18 are welded thereto as indicated at 22, so as to form a rigid unit.

A pair of bars 24 are provided, one end of each bar being welded to the top edge of the plate 20, and the opposite ends of the respective bars being welded to the respective sleeves 18 so as to form loops to which a swing chain may be attached for lifting the device by means of a hoist.

The respective sleeve members 18 are slotted at their lower ends on both the front and rear sides, as indicated at 26, so that the respective sleeve members will telescope over the respective upright standards 14, to permit the plate 20 to be lowered to the lower-most position. A second sleeve member 28 is secured within the respective sleeve members 18 by means of pins 30 that hold the upper ends of the respective pairs of sleeves 18—28 together. This pin is sufficiently loose fitting to permit the sleeves 28 to align readily with up-right screw threaded members 32.

The lower end of each sleeve 28 is screw threaded to threadably engage the respective screw members 32 that are journaled on the base 11 within the respective standards 14. A set collar 34 is positioned on the respective screw members 32 above the base 11, so as to maintain the respective screw members 32 against longitudinal movement with respect to the base 11. Each of the screw members 32 has a sprocket 36 positioned thereon, immediately below the base 11, which sprockets 36 are in driving alignment to receive a chain 38 therearound, as will best be seen in Fig. 4. A bevel gear 40 is secured to one of the screw members 32 below one of the sprockets 36 and is so mounted as to mesh with a pinion 42 that is mounted on a shaft 44. The shaft 44 extends outward through one of the transverse end members 12 and is journaled within bearings 46. The shaft 44 is squared at its outer end to receive a handle 48 to enable the turning of the pinion 42 and gear 40 to drive sprockets 36 that are connected by a chain 38, which will enable the rotation of the screw members 32, to move sleeves 28 and 18 therealong.

The upper end of each of the screw members 32 has the threads removed to the roots thereof as indicated at 50, which will enable the ready and simultaneous starting of both the sleeve portions 28 on the screw, upon rotation of the screw members 32.

The plate 20 has circumferentially spaced holes 52 formed around the periphery thereof, which holes are so spaced as to register with the respective holes of the differential D. The central opening 54 of the plate 20 is of sufficient size to admit ready access around the differential, when the bolts 56 have been used to secure the differential unit D to the plate 20. Since differential units differ both in size and in the hole spacing, adapted plates 21 are provided, which plates have the inner circumferential holes adapted to secure the adapter plate to the outer circumferential set of holes which are adapted to secure the respective plates 21 to the annular plate 20. In this manner the same mobile rack for handling differential units can be adapted to fit substantially all sizes and kinds of differentials. The holes in which the studs or cap screws are fitted are usually larger than the cap screws or studs to enable the cap screws and associated parts to be easily assembled, but this leads to misalignment in replacing the differential unit, if the various parts are not replaced with exact precision. To this end a dowel pin 58 threadably engages the differential unit D, and is tapered to engage either the auxiliary plate 21, if an auxiliary plate 21 is used, or to engage the annular plate 20, if an auxiliary plate 21 is not used. The dowel pin is of substantially the same diameter as the hole, therefore exact alignment of the plate back into the position from which it was removed is assured.

Operation

The form of the invention as illustrated in Figs. 1, 2 and 4, utilizes a pair of screw members 32 that threadedly engage sleeves 28 so as to permit the uniform raising and lowering of each of the respective sleeves and the sleeves 18 to which the annular plate 20 is rigidly secured, as by welding. In this manner the mobile differential gear unit handling rack is moved into position beneath the vehicle and with the annular plate 20 elevated to the proper height by the operation of the screw members, and with the auxiliary plate 21 bolted to the plate 20 by means of bolts 23, if an auxiliary plate is required, and with the dowel pin 58 fitted in one of the holes 52, and with the cap screws or studs removed from the differential housing that holds the differential gear unit in place with respect to the differential housing, fastening means, such as cap screws or bolts 56 are used to secure the plate 20 to the differential gear unit D. After the differential unit is securely fastened to the auxiliary plate 21 or to the plate 20, the unit is moved longitudinally of the vehicle until the differential gear unit clears the housing, whereupon the rack and the differential unit may be lowered and moved transversely of the vehicle until the rack and the differential unit D thereon is clear of the vehicle. The differential unit and rack may be lifted by screw members 32 or by a hoist to a suitable height for work to be done thereon.

The screw elements may be rotated by means of handle 48 to lower the plate 20 and the sleeves 18 to enable the removal of the differential unit D from beneath the vehicle frame F. Since the mobile rack is mounted on casters 3, it may be moved either laterally or longitudinally of the frame F, as desired, to remove the differential unit from the vehicle. If it is desired to elevate the differential unit D, so as to obtain better working conditions or position, for instance onto a work bench, swing chains of a hoist may be connected to the bars 24, and the device elevated by a hoist as desired. By utilizing the screw members 32 to elevate the upper portion of the rack until the threaded sleeve 28 disengages the screw members 32, the upper portion of the rack can be lifted, by means of a hoist, thereby making for ease in handling with a minimum of manual effort. As hereinbefore explained, the plate 20 or the plate 21 may be removed from the differential unit by leaving one or more dowel pins secured in the housing. The plate may be reinstalled on the differential unit with exact accuracy, whereupon the upper portion of the rack may be lowered onto unthreaded portions 50 of the screw members 32, then the operation may be reversed and the differential unit lowered into the lower-most position to enable the lowered handling rack to pass beneath the vehicle frame F. Then, with the differential unit in the proper place, the annular plate 20, supporting the differential unit can be jacked up until it is at the correct height to enable the interconnecting of the other parts without the necessity of manually lifting the differential unit. After the unit is fitted in place, the bolts 56 and dowel pin 58 may be removed.

Second form of invention

Figure 5:
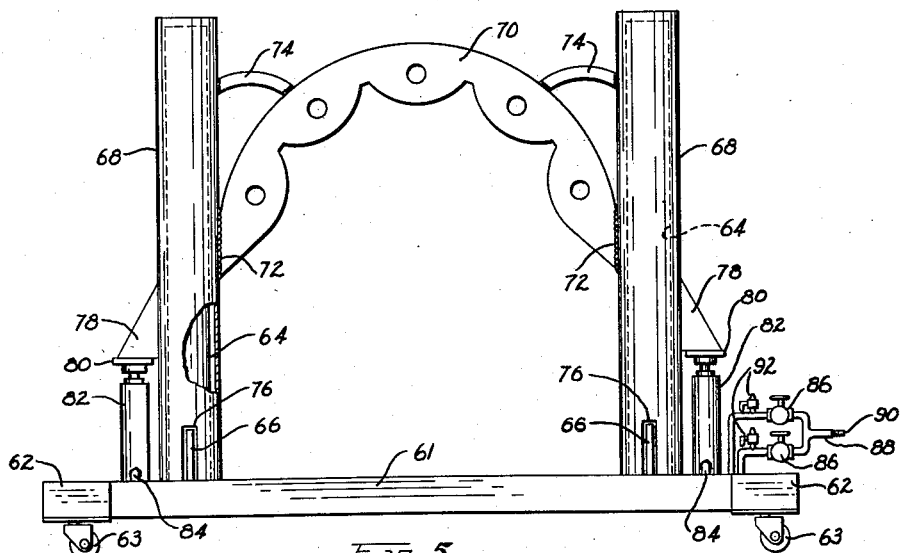
Fig. 5 is a front elevational view of a modified form of the device, wherein air is utilized to lift the differential holdng rack, with the rack made in a semi-circular design.
Figure 6:
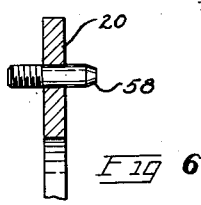
Fig. 6 is a fragmentary detailed view showing how a dowel pin interfits with the plate of the differential holding rack.

A modified form of the invention is shown in Fig. 5, in which the base 61 is of substantially the same character as the base 11, and has transverse end members 62 with casters 63 secured under each end of the transverse members 62, as described for the form above.

Upright standards 64 are positioned at an angle with respect to the vertical, substantially as shown in Fig. 2, and are held in position by web braces 66. However, in this form of the device, a sleeve 68 is telescoped over each of the respective standards 64. A semi-annular member 70 is positioned between standards 64 and is rigidly secured thereto as by welding, as indicated at 72. Bars 74 interconnect the upper portion of the semi-annular member 70 and the upper ends of the respective sleeves 68.

Each of the sleeves 68 has slots 76 in the lower ends thereof to enable the sleeves 68 to be lowered into the lowermost position, as indicated in Fig. 5. Each of the sleeves 68 has an outstanding lug 78 on which a plate 80 is secured, as by welding, to enable the placement of a pneumatic jack 82, which is preferably of the multiplunger, telescoping type to enable the sleeves 68 and the semi-annular plate member 70 to be raised to the desired height. A conduit 84 leads to the respective pneumatic jacks 82, and each of the conduits has a control valve 86 therein for directing the desired amount of air from an air line indicated at 88.

The air line 88 may be readily attached by a valve stem 90 to an air supply, through air hoses, such as normally found in garages and the like. Petcocks 92 are provided, one on each of the respective lines 84, to enable the bleeding of the lines 84 for lowering the respective pneumatic jacks 82.

The semi-annular member 70 is of such shape as to enable the differential unit to be bolted to the top thereof, leaving the lower portion unobscured by a plate, which is desirable under certain conditions.

It will be readily appreciated that the rack supporting the differential unit may be raised and lowered without manual effort, however, the removal of the differential unit and the replacement thereof, is performed in the same manner as for the form of the invention as described above, and illustrated in Figs. 1, 2, and 4.

The upper portion of the rack may be lifted with a hoist and sling chain, by anchoring the sling chains to bars 74, as the sleeves 68 will slide upward along the standards 64 and off the top thereof.

*Third form of invention*

Figure 9:
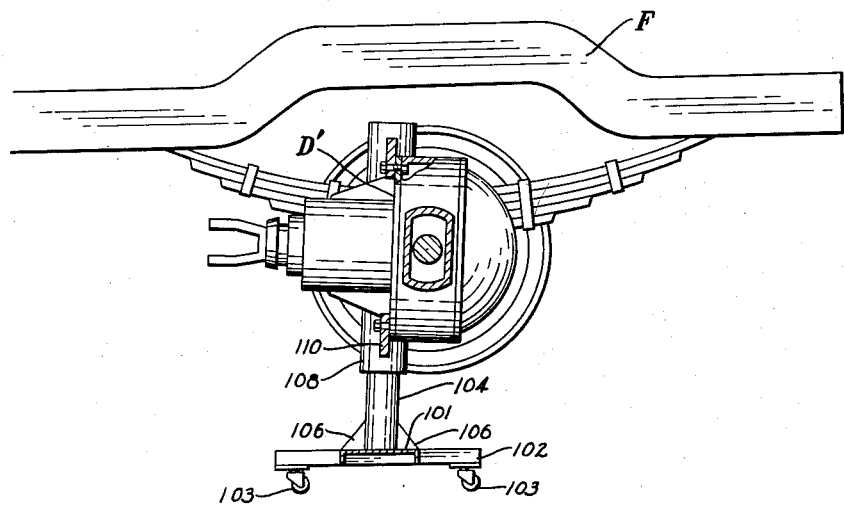
Fig. 9 is a side elevational view of the device embodying the invention as shown in Figs. 7 and 8, with parts broken away and shown in section, and with the device attached to the forward end of the differential unit.

The form of invention as shown in Figs. 7, 8 and 9, is of the same general character as the forms described above, and has a base 101 and transverse end members 102 secured thereto so as to form a rigid frame member. Casters 103 are provided in the same manner as described for the other forms, so the device may be readily movable in any direction.

Standards 104 are secured to the base 101 as by welding, and are disposed at an angle with respect to the vertical, as indicated in Fig. 8, which upright standards are braced by web brace members 106 in the manner previously described. A sleeve 108 is telescoped over each of the respective standards 104 and has an annular ring 110 rigidly secured thereto as by welding, as indicated at 112. Bars 114 interconnect the upper side of the plate 110 and the upper ends of the sleeves 108, so as to hold the unit in rigid relation. The respective sleeves 108 are slotted at 116 to enable the sleeves 108 to telescope over web braces 106 to enable the lowering of the sleeves 108 to the lower-most position. Each of the sleeves 108 has an outstanding lug 118 thereon, on which a plate 120 is fitted to enable the hydraulic jacks 122 to be attached to the base 101 and positioned below plate 120. The jack has the conventional operating handle 124 to operate the hydraulic pump in a manner well understood in the art.

In this manner the sleeves 108 may be lifted simultaneously, or, under certain conditions, one may be lifted or lowered out of synchronization with the other of the hydraulic jacks, thereby enabling the removal of the differential unit, if it is in a "bind" and therefore not readily responsive to removal by vertical raising or lowering.

It will be readily appreciated that this mobile differential unit rack may be utilized to remove the differential unit in the same manner as hereinbefore described, or by attachment to the forward end of the differential unit D as shown in Fig. 9. The upper portion of the rack may be removed from the standards 104 by means of a hoist, in the manner hereinbefore set out, for the forms of the invention described above.

It is to be pointed out that the auxiliary plate 21 and the dowel pin 58 are used in the same manner in all forms of the invention, and with the upstanding standards being parallel and disposed at an angle of about five degrees with respect to the vertical which enables the differential unit to be removed and replaced at the same angle it occupies in the housing, without the necessity of manual handling, which is very important, since these units sometimes weigh several hundred pounds. The use of the present mobile rack enables the removal and replacement of the differential unit with a minimum of manual effort and with a minimum of crew.

While the invention has been described and illustrated in the three embodiments thereof, it is to be pointed out that the racks all attach to the differential unit in substantially the same manner, it is to be pointed out that changes may be made in the minor details of construction without departing from the spirit of the invention or the scope of the appended claims.

Having thus clearly shown and described the invention, what is claimed as new and desired to secure by Letters Patent is:

1. In a mobile rack for removing and replacing a vehicle differential unit, a base, rollers mounted on the bottom of said base and depending therefrom to support said base for movement over a surface, a pair of parallel, upright standards spaced apart and secured to said base, a removable, transverse support sleeve telescoped over each of said standards, a transverse support member mounted between said sleeves and secured thereto, apertures formed in said support member and adapted to register with certain apertures formed in said differential unit, fastening means positioned in said apertures for securing said support member and said differential unit in rigid relation, and screw jack means having a screwthreaded sleeve interior of said standard and said transverse support mounting sleeve being exterior of said standard, which sleeves are secured together and are mounted on said base for simultaneously moving said respective sleeves along the respective standards on which they are mounted.

2. In a mobile rack for removing and replacing a vehicle differential unit, a base, rollers mounted on the bottom of said base and depending therefrom to support said base for movement over a surface, a pair of parallel, upright standards spaced apart and secured to said base, a sleeve detachably telescoped over each of said standards, an outstanding bracket on each of said sleeves, a transverse support member mounted between said sleeves and secured thereto, apertures formed in said support member and adapted to register with certain apertures formed in said differential unit, fastening means positioned in said apertures for securing said support member and said differential unit in rigid relation, and jacks mounted on said base adjacent the respective sleeves and adapted to engage said respective outstanding brackets for simultaneously moving said respective sleeves along the respective standards on which they are mounted.

3. In a mobile rack for removing and replacing a vehicle differential unit, a base, rollers mounted on said base for supporting said base for movement over a surface, a pair of parallel, upright standards, spaced apart and secured to said base, a sleeve loosely telescoped over each of said standards, at least a semi-annular support member secured to each of said sleeves approximately mediate thereof for movement therewith, said support member having apertures formed therein to register with certain apertures formed in said differential unit, outstanding brackets intermediate the length of each of said sleeves and adapted to receive a jack thereunder.

4. The device substantially as set forth in claim 3, wherein fluid actuated jack means is provided intermediate said base and said outstanding brackets for lifting said sleeves.

5. In a mobile rack for removing and replacing a vehicle differential unit, a base, rollers mounted on said base for supporting said base for movement over a surface, a pair of parallel, upright standards spaced apart and secured to said base, a sleeve loosely telescoped over each of said upright standards, at least a semi-circular support member secured to said sleeves approximately mediate thereof for movement therewith, said support member having apertures formed therein to register with certain apertures formed in said differential unit, said loosely fitting sleeves which telescope over the respective standards being slidable off the upper end of the respective standards.

References Cited in the file of this patent

UNITED STATES PATENTS

| | | |
|---|---|---|
| 1,088,049 | Weaver | Feb. 24, 1914 |
| 2,530,138 | Wallace | Nov. 14, 1950 |
| 2,535,759 | Schwanter | Dec. 26, 1950 |
| 2,553,156 | Woodward | May 15, 1951 |
| 2,636,715 | Griffin | Apr. 28, 1953 |
| 2,702,689 | Smith | Feb. 22, 1955 |

FOREIGN PATENTS

| | | |
|---|---|---|
| 453,953 | Germany | Dec. 24, 1927 |
| 470,701 | Germany | Jan. 29, 1929 |